US011878809B2

(12) United States Patent
Negulescu et al.

(10) Patent No.: US 11,878,809 B2
(45) Date of Patent: Jan. 23, 2024

(54) AIRCRAFT PROPULSION ASSEMBLY COMPRISING TWO ADJACENT ENGINES, OF WHICH THE OUTLET NOZZLES HAVE A STRAIGHT PORTION IN THE VICINITY OF A MEDIAN PLANE OF THE PROPULSION ASSEMBLY

(71) Applicant: Airbus Operations S.A.S., Toulouse (FR)

(72) Inventors: Camil Negulescu, Toulouse (FR); Jean-Michel Rogero, Toulouse (FR)

(73) Assignee: Airbus Operations S.A.S.

( * ) Notice: Subject to any disclaimer, the term of this patent is extended or adjusted under 35 U.S.C. 154(b) by 1312 days.

(21) Appl. No.: 16/355,999

(22) Filed: Mar. 18, 2019

(65) Prior Publication Data

US 2019/0291885 A1 Sep. 26, 2019

(30) Foreign Application Priority Data

Mar. 23, 2018 (FR) .................................. 18 52527

(51) Int. Cl.
*B64D 33/02* (2006.01)
*F02K 3/077* (2006.01)
(Continued)

(52) U.S. Cl.
CPC ................ *B64D 33/02* (2013.01); *B64C 7/02* (2013.01); *B64D 27/10* (2013.01); *B64D 27/16* (2013.01); *B64D 29/00* (2013.01); *B64D 33/04* (2013.01); *F01D 25/24* (2013.01); *F02K 3/04* (2013.01); *F02K 3/077* (2013.01); *F02K 3/12* (2013.01);
(Continued)

(58) Field of Classification Search
CPC .......... B64D 33/02; B64C 7/02; F02K 3/077; F02K 3/12
See application file for complete search history.

(56) References Cited

U.S. PATENT DOCUMENTS 3,060,685 A 10/1962 Tonnies et al.
4,149,374 A * 4/1979 Barchenko ................ F02K 3/12
60/39.15

(Continued)

FOREIGN PATENT DOCUMENTS

DE 20 16 805 A1 10/1970
DE 10 2008 024463 A1 12/2009
(Continued)

OTHER PUBLICATIONS

FR 18 52527 Search Report dated Sep. 20, 2018.

*Primary Examiner* — Nicholas McFall
(74) *Attorney, Agent, or Firm* — Lerner David LLP

(57) ABSTRACT

An aircraft propulsion assembly includes a first engine and a second engine that are adjacent and a nacelle in which the engines are installed. The nacelle includes a common air inlet lip for the first engine and the second engine, the air flow being divided between the first engine and the second engine by a median lip which extends, at least partly, set back from said common air inlet lip. The common are inlet lip includes, directly in line with the median lip, a bottom lobe and a top lobe extending forward of the nacelle. Such a configuration makes it possible to be able to provide a high aerodynamic form between the fairings of the engines, without the risk of generating overspeeds in the air flow.

18 Claims, 3 Drawing Sheets

(51) Int. Cl.
  *B64C 7/02*   (2006.01)
  *F02K 3/12*   (2006.01)
  *B64D 29/00*  (2006.01)
  *F01D 25/24*  (2006.01)
  *F02K 3/04*   (2006.01)
  *B64D 33/04*  (2006.01)
  *B64D 27/10*  (2006.01)
  *B64D 27/16*  (2006.01)

(52) U.S. Cl.
  CPC ............... *B64D 2033/0266* (2013.01); *F05D 2220/323* (2013.01)

(56) References Cited

U.S. PATENT DOCUMENTS

| | | | |
|---|---|---|---|
| 5,114,097 A | | 5/1992 | Williams |
| 6,016,651 A | * | 1/2000 | Hammond ............... F02K 1/48 239/265.17 |
| 8,256,706 B1 | * | 9/2012 | Smith ............... B64D 33/02 137/15.1 |
| 8,402,740 B2 | | 3/2013 | Guemmer |
| 2002/0096598 A1 | | 7/2002 | Nelson |
| 2008/0245925 A1 | | 10/2008 | Udall |
| 2010/0163670 A1 | * | 7/2010 | Dizdarevic ............ B64C 39/12 244/36 |
| 2017/0081036 A1 | | 3/2017 | Marrinan et al. |

FOREIGN PATENT DOCUMENTS

| | | | |
|---|---|---|---|
| FR | 2041146 A1 | 1/1971 | |
| GB | 1 030 521 A | 5/1966 | |

\* cited by examiner

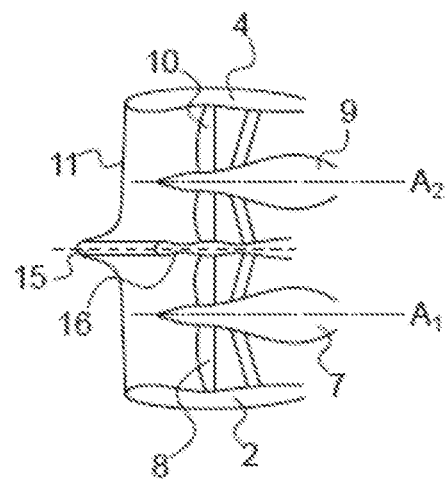
Fig. 4
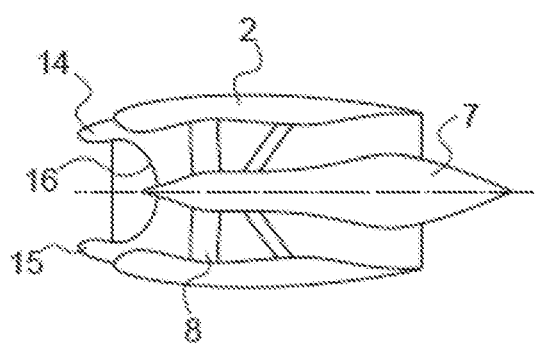
Fig. 5
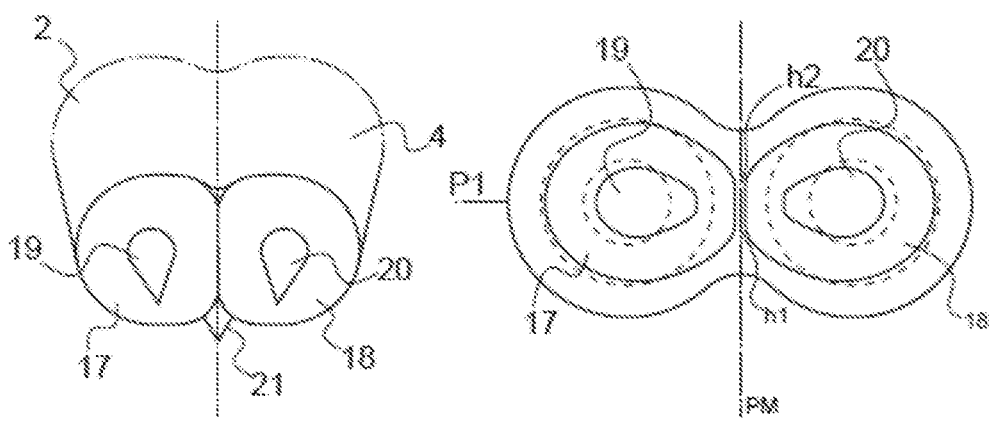
Fig. 6
Fig. 7

AIRCRAFT PROPULSION ASSEMBLY COMPRISING TWO ADJACENT ENGINES, OF WHICH THE OUTLET NOZZLES HAVE A STRAIGHT PORTION IN THE VICINITY OF A MEDIAN PLANE OF THE PROPULSION ASSEMBLY

FIELD OF THE INVENTION

The present invention relates to the field of aircraft propulsion assemblies. It relates more particularly to the architecture of the propulsion assemblies comprising two adjacent engines, that is to say engines positioned side-by-side in proximity to one another.

BACKGROUND OF THE INVENTION

Aircraft propulsion assemblies comprising two adjacent engines have been employed in particular on certain commercial aircraft, such as the "VC-10" model from the aeronautical constructor Vickers of the British Aircraft Corporation and the "IL-62" model from the aeronautical constructor Ilyushin. The propulsion assemblies with adjacent engines known from the state of the art are nevertheless globally designed as the juxtaposition of two propulsion assemblies. The integration between the engines, in particular with respect to the nacelle with which they are fed, is low. In other words, the nacelle of these assemblies is designed virtually as two propulsion assembly nacelles with a single isolated engine, joined and fed together in the inter-nacelle zone.

According to such a design of the propulsion assemblies with adjacent engines, a bulky fairing has to be formed between the engines. This fairing needs to have, for aerodynamic purposes, a rear appendage called "beaver tail". The result of this design according to the state of the art of the propulsion assemblies with adjacent engines is that their nacelle has a significant wetted surface, which increases the friction drag generated by the propulsion assembly. The wetted surface corresponds to the surface in contact with the outside air flow.

Also, the fairing imposing between the engines and the interactions between the fairing of each of the engines generates overspeeds in the flow of air flowing between the engines, which leads to variations of density of the air and the generation of a compressibility drag, even shockwaves in the inter-engine zone.

Thus, the aerodynamic losses, linked to the friction or compressibility drag, are significant in the space separating the nozzles of the two engines of the propulsion assembly.

BRIEF SUMMARY OF THE INVENTION

Aspects of the invention propose a propulsion assembly architecture with adjacent engines that is optimized so as to limit the aerodynamic losses.

Thus, the invention relates to an aircraft propulsion assembly comprising a first engine and a second engine that are adjacent and a nacelle in which said first and second engines are installed. The nacelle comprises a common air inlet lip for the first engine and the second engine, the air flow being divided between the first engine and the second engine by a median lip which extends, at least partly, set back from said common air inlet lip. The common air inlet lip comprises, directly in line with the median lip, a bottom lobe and a top lobe extending forward of the nacelle.

This configuration makes it possible to be able to provide a high aerodynamic form between the fairings of the engines, without the risk of generating overspeeds in the air flow. The top and bottom lobes smooth the flow of the air outside the nacelle, in the inter-fairing zones.

The median lip can have a curvature in the median plane such that it joins said bottom lobe and top lobe by forming substantially a circular arc.

An outer surface of the nacelle of the propulsion assembly can form a single aerodynamic surface common to the two engines.

The first engine can comprise a first gas ejection nozzle and the second engine can comprise a second gas ejection nozzle. The first nozzle and the second nozzle can each have an outlet section, defined by an outer wall of the nozzle, of which a portion is substantially straight, the propulsion assembly being configured such that the straight portion of the outlet section of the first nozzle and the straight portion of the outlet section of the second nozzle are facing one another on either side of a median plane of symmetry of the propulsion assembly, in contact with one another, or form a wall common to said nozzles at said median plane of symmetry of the propulsion assembly.

The use of gas ejection nozzles having a non-circular outlet section, and in particular having a substantially straight section, allows them to be brought closer together in order to limit or eliminate the space between the nozzles which, in the state of the art, necessitates the use of a bulky fairing to avoid the separation of the air passing through this space. In particular, the walls forming the first nozzle and the second nozzle are brought closer to the median plane of symmetry of the propulsion assembly so as to become very close to one another, and common or in contact at the outlet of the nozzles. That goes hand in hand with a great proximity between the engines of the propulsion assembly. The great proximity between the engines makes it possible to limit the space between the fairing of each engine formed by the nacelle.

The outlet section of each nozzle can comprise a substantially semi-circular portion, opposite said median plane (PM) of symmetry of the propulsion assembly.

Each nozzle can comprise a cone extending longitudinally inside said nozzle and through its outlet section, said cone being shaped such that, at the outlet section of the nozzle, the distance between said cone and the outer wall of the nozzle is substantially constant over all the perimeter of said cone.

The respective outlet sections of the first nozzle and of the second nozzle can be dissymmetrical relative to the plane orthogonal to the median plane of symmetry of the propulsion assembly passing through a main axis of the first engine and through a main axis of the second engine.

The outlet sections of the nozzles can be oriented so as to be convergent toward the median plane.

In an aircraft propulsion assembly comprising a wall common to the nozzles, said common wall can be stopped upstream of the respective outer walls of said nozzles, so as to form an augmented outlet section suitable for maximizing the thrust when only one of said first engine and second engine is operating.

The aerodynamic surface can be prolonged beyond the outlet section of the nozzles, at the median plane, by a local fairing.

The first engine can comprise a first fan, and the second engine can comprise a second fan, the first fan and the second fan extending in one and the same plane, and wherein the circle in which the first fan is inscribed in rotation is separated by at most thirty centimetres, and preferably at most twenty centimetres, from the circle in which the second fan is inscribed in rotation.

The invention relates also to an aircraft comprising an aircraft propulsion assembly as previously described. Said assembly can in particular be installed either at a double nose cone that a fuselage of the aircraft comprises, or under the airfoil, or in lateral position at a tail cone of an aircraft fuselage.

Other particular features and advantages of the invention will become more apparent from the following description.

BRIEF DESCRIPTION OF THE DRAWINGS

In the attached drawings, given as nonlimiting examples:

FIG. 4 represents, by a partial cross-sectional schematic view, the front part of the aircraft propulsion assembly of FIG. 3;

FIG. 5 represents, by another cross-sectional schematic view, the propulsion assembly of FIG. 3;

FIG. 6 represents, by a three-dimensional partial schematic view, the rear part of a propulsion assembly according to an embodiment of the invention;

FIG. 7 represents, by a theoretical view, the outlet section of the nozzles of a propulsion assembly according to an embodiment of the invention;

DETAILED DESCRIPTION

Figure 1:
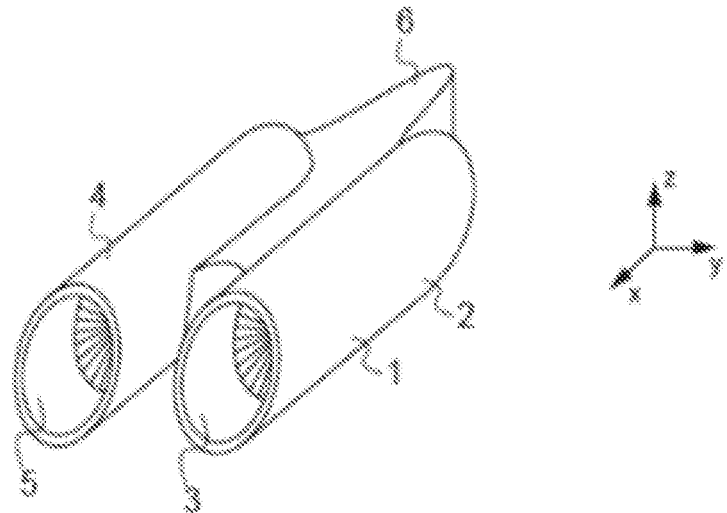
FIG. 1 represents, by a three-dimensional schematic view, an aircraft propulsion assembly with adjacent engines as known in the state of the art.

In a propulsion assembly with adjacent engines as known in the state of the art, a first engine and a second engine are juxtaposed to one another in a so-called transverse direction (y). The longitudinal direction (x) is defined according to the general direction of extension of the engines, which corresponds also to the general direction of the gas flow in the engines and in the nacelle which encircles them.

Finally, a third direction, at right angles to the longitudinal direction (x) and to the transverse direction (y) is called vertical direction (z) in as much as, when the propulsion assembly is installed on an aircraft having a zero incidence angle, the longitudinal (x) and transverse (y) directions define a substantially horizontal plane.

Likewise, in the present document, the concepts of "upstream" and "downstream", or "front" and "rear" are understood according to the flow of the gas flow in the propulsion assembly.

The first engine and the second engine are installed in a nacelle 1. The nacelle 1 is designed in the state of the art as two isolated engine nacelles, juxtaposed and linked to one another. Thus, the first engine comprises a first aerodynamic fairing 2, provided with a first air inlet 3 defined by a circular lip (or a lip having an edge according to a closed curve). The second engine comprises a second aerodynamic fairing 4, provided with a second air inlet 5 defined by a lip that is identical to that of the first fairing 2.

The first fairing 2 and the second fairing 4 are treated, with regard to their design, in particular in aerodynamic terms, as nacelle fairings of single-engine propulsion assemblies.

Nevertheless, the first aerodynamic fairing 2 is linked to the second aerodynamic fairing 4 so as to form a single nacelle which accommodates the two engines. The duly formed nacelle constitutes a single fairing (comprising the first fairing and the second fairing) which has a large joining surface between the first fairing 2 and the second fairing 4.

That results in a bulky nacelle, and causes significant aerodynamic interactions between the first fairing 2 and the second fairing 4.

The first engine comprises a first gas ejection nozzle, and the second engine comprises a second gas ejection nozzle. Between the outlet of the first nozzle and the outlet of the second nozzle, it may be necessary to add an aerodynamic appendage, called beaver tail 6, which guides the outgoing flow from the nozzles and the air which circumvents the nacelle in the faired zone situated between the engines.

That also increases the volume and therefore the wetted surface of the nacelle. The enlarged wetted surface of the nacelle generates a significant friction drag, and the imperfect treatment of the interactions between the first fairing 2 and the second fairing 4, and more generally of the air flows around the nacelle that can exhibit overspeeds, results in a compressibility drag. The aerodynamic losses associated with the friction and compressibility drags generate an excess consumption of fuel that should be limited as much as possible.

Figure 2:
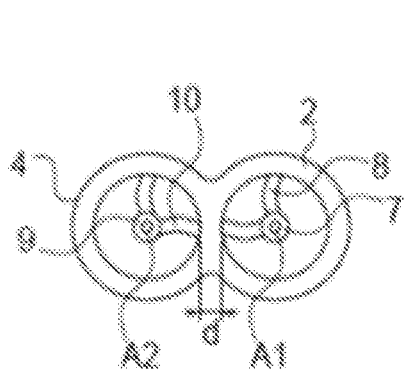
FIG. 2 represents, by a front theoretical view, an aircraft propulsion assembly according to an embodiment of the invention.

FIG. 2 represents an aircraft propulsion assembly according to an embodiment of the invention. FIG. 2 is a front theoretical view, that is to say illustrating the air inlet in the nacelle in the foreground, and aiming to illustrate the convergence between the first engine and the second engine that can be implemented in the invention. The convergence that can be applied between the engines is generally dictated by the size of their element of largest dimension, in a vertical transverse plane, namely the fan. The first engine 7 (here represented by its fan cone) comprises a first fan 8 rotating on a first main axis A1 of the first engine 7, the second engine 9 (here represented by its fan cone) comprises a second fan 10 rotating on a second main axis A2 of the second engine 9. Each fan comprises a set of blades whose rotational movement is inscribed in a circle. In the invention, the distance d between the circle in which the first fan is inscribed in rotation and the circle in which the second fan is inscribed in rotation can be reduced to less than thirty centimetres, for example of the order of twenty centimetres.

This great proximity is made possible by certain characteristics developed in the invention and which will be detailed hereinbelow, and, reciprocally, allows the implementation thereof. It allows for the improved integration of the first fairing 2 formed around the first engine 7 and of the second fairing 4 formed around the second engine 9.

Figure 3:
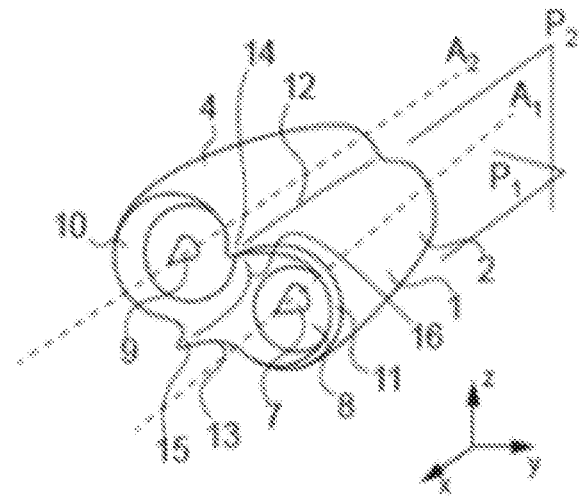
FIG. 3 represents, by a three-dimensional schematic view similar to that of FIG. 1, an aircraft propulsion assembly according to an embodiment of the invention.

FIG. 3 represents an aircraft propulsion assembly according to an embodiment of the invention.

In the exemplary embodiment represented in FIG. 3, the first engine 7 and the second engine 9 comprise a common air inlet, formed by a common air inlet lip 11.

Compared to a propulsion assembly with adjacent engines as known in the state of the art, the convergence between the first engine 7 and the second engine 9 applied in this embodiment of the invention reduces the space between the first fairing 2 of the first engine 7 and the fairing 4 of the second engine 9. Nevertheless, there is still a risk of overspeeds in the median zone of the nacelle, or top inter-fairing zone 12 and bottom inter-fairing zone 13.

The concepts of "top" and "bottom" are understood according to the so-called vertical direction z. The top part of the propulsion assembly is thus that which is situated upward when the propulsion assembly is installed on an aircraft.

The inter-fairing zone must be fed in a suitable manner, to avoid the generation of overspeeds. In particular, the aerodynamic fairing of this zone must not be lowered (that is to say brought closer to the plane of the main axes A1, A2 of the engines) so that the volume between the first fairing 2 and the second fairing 4 becomes a constrained volume which could result in the generation of overspeeds and shockwaves resulting in aerodynamic losses.

Nevertheless, an excessively high fairing (away from the plane of the main axes of the engines) is also likely to generate overspeeds in the air flow circumventing the nacelle in this zone, because of the significant thickness of the nacelle. In order to be able to form a high aerodynamic form, top and bottom, between the first and second fairings 2, 4 without the risk of generating overspeeds in the air flow, the air inlet of the common air inlet lip 11 comprises a top lobe 14 which prolongs, forward of the nacelle, the fairing of the top inter-fairing zone 12. The common air inlet lip 11 comprises a bottom lobe 15 which prolongs, forward of the nacelle, the fairing of the bottom inter-fairing zone 13. These top and bottom lobes 14, 15 smooth the flow of the air outside the nacelle 1, in the inter-fairing zones 12, 13.

The result thereof is that the nacelle forms a single aerodynamic surface common to the two engines. This aerodynamic surface does not exhibit any abrupt break in its form: the forms of the nacelle are rounded, and have radii of curvature that are as big as possible; the nacelle is for example devoid of concave edges in the inter-fairing zone.

In order to separate the air flow entering into the common air inlet formed by the common air inlet lip 11, a median lip 16 is formed in a vertical median plane of the propulsion assembly. Thus, the top and bottom lobes 14, 15 are formed directly in line with the median lip 16.

The median lip 16 extends set back from the common lip 11, for example as illustrated in FIGS. 4 and 5.

FIG. 4 is a view of the front part of the propulsion assembly of FIG. 3, in cross section along a horizontal cutting plane P1 (parallel to the longitudinal direction x and to the transverse direction y) passing through the main axes A1, A2 of the engines. FIG. 5 is a view of the propulsion assembly of FIG. 3, in cross section along a vertical cutting plane P2, parallel to the vertical direction z and to the longitudinal direction x, passing through the first main axis A1 of the first engine 7.

Because of the retracted position of the median lip 16 and its form, the separation of the air flow toward the first engine 7 and the second engine 9 is produced downstream of the common air inlet. The formation of the median lip 11 is made possible by the great proximity between the first engine 7 and the second engine 9. In a vertical plane, the median lip 16 has a form curved toward the interior of the nacelle 1. In particular, the median lip joins the top lobe 14 and the bottom lobe 15 substantially in a circular arc.

Local overspeed zones on the median lip 16 can occur in proximity to the zone of passage of the blades of the first fan 8 and of the second fan 10, that is to say in the part of the median lip 16 most retracted in the nacelle 1. The aerodynamic profile of the median lip can be adapted to avoid these overspeed phenomena.

It is notable that this risk of overspeed in the air flow absorbed in the nacelle does not exist in the context of a propulsion assembly with boundary layer ingestion, as is the case for example in the example represented in FIG. 10, which will be detailed hereinbelow. In fact, the boundary layer ingested by the propulsion assembly exhibits a low flow speed compared to the rest of the flow.

FIG. 6 schematically represents the rear part of a propulsion assembly according to an embodiment of the invention. In particular, FIG. 6 illustrates the first nozzle 17 of the first engine 7 and the second nozzle 18 of the second engine 9. The invention aims to reduce or eliminate the space between the nozzles of the engines of the propulsion assembly. In effect, this space, which is situated in the rear part of the top inter-fairing zone 12 and in the rear part of the bottom inter-fairing zone 13, necessitates, in the state of the art, the implementation of a bulky fairing to allow the air passing through the inter-fairing space to circumvent the nacelle without separation. This fairing has a significant wetted surface and thus causes aerodynamic losses through friction and compressibility.

To limit the size of this fairing, the external lines of the adjacent first nozzle 17 and second nozzle 18 are brought closer together and brought into contact as much as possible.

The nozzles 17, 18 are brought closer to the vertical median plane PM of the propulsion assembly, such that their external lines become, in the zone of proximity, common, adjacent or at the very least very close. The result thereof is that the first nozzle 17 and the second nozzle 18 have an outer wall, which defines the respective outlet section of the nozzle, of which a portion is substantially straight. This straight section is parallel to the median plane PM and in proximity thereto. Thus, the straight portion of the outlet section of the first nozzle is arranged facing the straight portion of the outlet section of the second nozzle, on either side of the median plane PM of symmetry of the propulsion assembly. The nozzles 17, 18 thus have common external lines, adjacent or at the very least very close, at least in this straight section. The nozzles 17, 18 are thus in contact with one another in the straight portion of their wall, or these straight portions form a wall common to said nozzles.

A separation of the nozzles 17, 18, for example by a wall common to the two nozzles, is necessary in order to avoid performance reduction due to an excessively great increase in effective nozzle section for an engine in operation, in the case of a shutdown of the other engine of the propulsion assembly with adjacent engines. However, in one embodiment, this separation (for example this common wall) can be stopped slightly, that is to say a few centimetres, upstream of the outlet of the nozzles, at their respective outer wall, so as to form an augmented outlet section optimized to maximize the thrust of the engine that is still operating in the case where the other engine might not be operating.

The length (or height, this dimension being oriented in the vertical direction z) of the straight portion of the wall of the two nozzles 17, 18 is determined by the convergence applied between said nozzles, but also by the neck angle of the outer inter-nacelle surface. The neck angle is defined by the extreme orientation of the nacelle with respect to the main axes A1, A2 of the engines respectively for the first fairing 2 and the second fairing 4. A significant neck angle reflects a pronounced curvature to the rear of the nacelle, likely to cause separations of the air flow around the nacelle and aerodynamic disturbances generating aerodynamic losses.

The length of the straight part of the wall of the nozzles is thus determined to obtain an acceptable neck angle in the outer inter-nacelle zone (top and bottom).

FIG. 7 illustrates the outlet section of the nozzles 17, 18 of a propulsion assembly according to an embodiment of the invention, compared to the nozzle outlet section according to the state of the art. The first nozzle 17 comprises a first outlet cone 19. The second nozzle 18 comprises a second outlet cone 20. Each cone 19, 20 extends longitudinally in the nozzle that is equipped with it, and extends through its outlet section. In FIG. 7, the outlet section of the nozzles 17, 18 and the outline of the cones 19, 20 according to the invention are represented by solid lines, whereas the outlet section of nozzles according to the state of the art and the outline of conventional cones are represented by dotted lines.

Since the outlet surface of the nozzles of the state of the art is optimized to improve the thrust and the efficiency of the engines, there is a tendency to keep the value of this surface unchanged. On the other hand the lateral external lines (wall of the nozzles furthest away from the median plane PM) of the nozzles can be moved (compared to the state of the art) toward said median plane PM. This convergence is done in a balanced manner over the circumference of the nozzle so as not to locally significantly increase the neck angle of the outer aerodynamic lines of the nacelles. On the other hand, the geometry of the cone 19, 20 of each nozzle can be modified (compared to the state of the art) to be adapted to the section of the nozzles proposed in the invention. For example, in particular in the plane of the outlet section of the nozzles, the form of each cone 19, 20 can be adapted such that the distance between said cone and the outer wall of the nozzle is substantially constant. The distance between the cone and the outer wall of the nozzle corresponds to the shortest distance separating the cone at a particular point, and said inner wall of the nozzle.

In other words, the cone 19, 20 is modified compared to the state of the art in a manner similar to the nozzle in which it extends.

It will be noted that the straight section of the outer wall of the nozzles is arranged vertically between a bottom point h1 and a top point h2 of the median plane PM. In the example represented here, h1 and h2 are positioned equidistant from the plane P1 passing through the main axes A1, A2 of the engines 7, 9. Nevertheless, the points h1 and h2 can be arranged at different distances from said plane P1 passing through the main axes A1, A2, such that the nozzles are dissymmetrical relative to the plane P1. This dissymmetry can be introduced to increase the resistance of the nacelle to the phenomenon of separation of the air flow when said nacelle has a positive incidence. Such is the case in a majority of flight phases of an aircraft equipped with the propulsion assembly.

Finally, in order to avoid a risk of local separation of the air flow circumventing the nacelle in the inter-fairing zone, a small local fairing 21 can be formed between the nozzles. This small local fairing 21 can in particular extend toward the rear of the inter-fairing zone, beyond the outlet of the nozzles. This small local fairing 21 has a very limited volume, with no similarity whatsoever with a beaver tail 6 implemented in the state of the art.

The modification of the section of the nozzles 17, 18, and in particular the shifting of the walls of the nozzles furthest away from the median plane PM toward said median plane PM necessitates a modification of the geometry of the rear of the nacelle to keep the outlet surface of the nozzles unchanged.

Figure 8A:
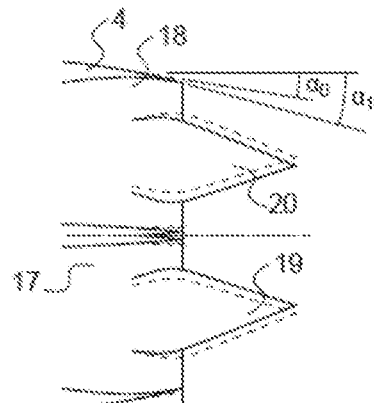
FIGS. 8a and 8b represent, by a cross-sectional view, the rear parts of two alternative embodiments of a propulsion assembly according to the invention.

FIG. 8a represents, by a cross-sectional view along the first cutting plane P1, the rear part of a propulsion assembly according to an embodiment of the invention. FIG. 8a shows, by dotted lines, the rear profile of the nacelle and the cones known in the state of the art, that is to say as they would appear if the engines were simply brought closer together without modifying the configuration of the nozzles. In the embodiment of FIG. 8a, the walls respectively forming the outlet of the first nozzle 17 and of the second nozzle 18 are brought closer to the median plane PM, without being combined. The cones 19, 20, in addition to their modification of form, are offset toward the median plane PM. In order to maintain the value of the surface of the outlet section of the nozzles, the neck angle $\alpha 1$ is increased compared to the reference neck angle $\alpha 0$ of the state of the art.

Figure 8B:
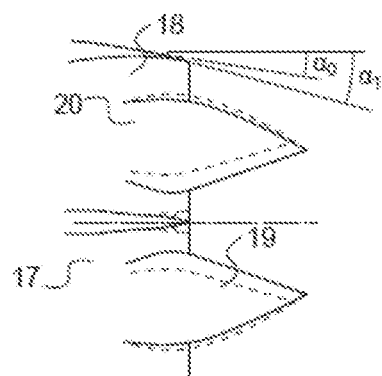

FIG. 8b corresponds to an alternative embodiment in which a single wall forms the outlet of the first nozzle and of the second nozzle, at the median plane PM. That shifts the cone of each nozzle all the more toward said median plane PM. In this configuration, the neck angle $\alpha 1$ is increased, as much as possible.

In the case where the reference neck angle $\alpha 0$ already has a maximum allowable value, the modification of the configuration of the section of the nozzles can consist in retaining (compared to the state of the art) the position of the outer wall of the semi-circular nozzle which is separated from the median plane PM, and in consequently increasing the volume of the cone installed in the nozzle.

Figure 9A:
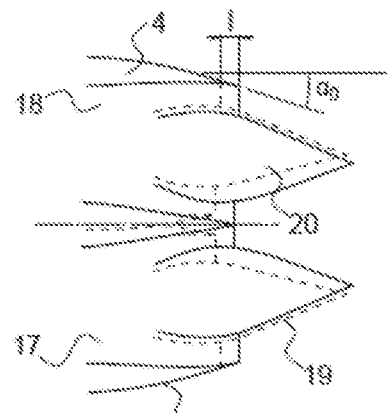
FIGS. 9a and 9b represent, by a cross-sectional view, the rear parts of two alternative embodiments of a propulsion assembly according to the invention.
Figure 9B:
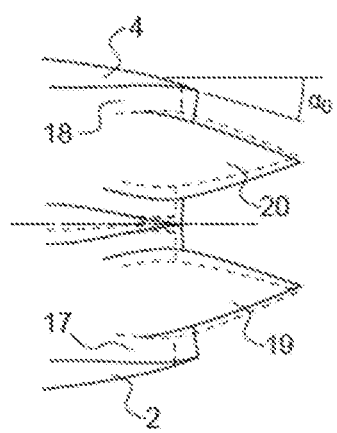

FIGS. 9a and 9b represent, by a view similar to that of FIGS. 8a and 8b, two alternatives that can be employed to keep the outlet surface of the nozzles unchanged compared to the state of the art, in the case where the reference neck angle $\alpha 0$ already has a maximum allowable value.

As for FIGS. 8a and 8b, the rear profile of the nacelle and the cones known in the state of the art, that is to say as they would appear if the engines were simply brought closer together without modifying the configuration of the nozzles, is represented by way of comparison by dotted lines.

To address this issue, FIG. 9a proposes increasing the length of the nacelle toward the rear, by a length l, uniformly in the longitudinal direction x, by keeping the reference neck angle $\alpha 0$.

Alternatively, FIG. 9b proposes elongating the nacelle only on the lateral outer parts of the nacelles. The result thereof is nozzles with skewed nozzle outlet sections, oriented so as to converge toward the median plane PM of vertical symmetry of the two engines. The increase in the surface of the nacelle associated with its elongation is however limited compared to the alternative of FIG. 9a.

In these two alternatives, presented respectively in FIGS. 9a and 9b, the surface of the nozzles is increased by the increase in their length, but this increase in surface is less than the surface of the fairing needed in the state of the art to fill the space between circular nozzles. The result thereof is a significant gain in terms of aerodynamic losses through friction.

The invention thus proposes an aircraft propulsion assembly comprising a nacelle, an air inlet and nozzles that are very strongly integrated to reduce the aerodynamic drag and thus the fuel consumption of the aircraft equipped with the propulsion assembly.

In particular, the invention proposes, for propulsion assemblies with adjacent engines, a totally integrated aerodynamic nacelle that can have:

an aerodynamic surface common to the two engines, with an inter-fairing zone that is optimized, for example by the presence of a top lobe and a bottom lobe, an air inlet common to the two engines with a retracted common median lip, and non-circular nozzles, close together or laterally in contact in the median plane of the propulsion assembly.

The abovementioned characteristics can be applied independently of one another, particularly according to the proximity of the two engines and their architecture. For a propulsion assembly having these three characteristics, the gain in fuel consumption associated with the reduction of the aerodynamic losses is of the order of two to four percent compared to a propulsion assembly which would be constructed according to the state of the art.

Figure 10:
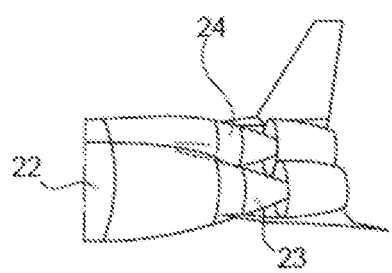
FIG. 10 represents, by a three-dimensional schematic view, the rear part of an aircraft having a configuration particularly suited to receiving a propulsion assembly according to the invention.

A propulsion assembly according to the invention is particularly suitable for use on a convergent double rear cone aircraft with adjacent engines, the rear part of which is represented in FIG. 10. In such an aircraft, the fuselage 22 is divided at its rear end into a first cone 23 and a second cone 24. Each cone is associated with an engine: the first cone 23 is associated with the first engine 7 of the propulsion assembly, the second cone 24 is associated with the second engine 9. The air flow entering respectively into each engine then comprises the boundary layer formed on the surface of the first cone 23 and of the second cone 24. That can improve the efficiency of the engines.

A propulsion assembly according to the invention can nevertheless be employed successfully under the airfoil of an aircraft or in lateral position at the tail cone of an aircraft fuselage. Other locations of the propulsion assembly can be envisaged, without departing from the scope of the invention. The description of an embodiment of the invention given above relates to a horizontal arrangement of the adjacent engines, that is to say with adjacent engines having their main axes in the plane comprising the longitudinal (x) and transverse (y) directions. Nevertheless, a relative vertical arrangement of the adjacent engines, or an arrangement of the adjacent engines in any other plane is not excluded from the invention.

Likewise, the above description has been given on the basis of engines having their main axes oriented in the longitudinal direction (x). For practical reasons, the engines can however be aligned with a few degrees of angle to the yaw axis and to the pitch axis of the aircraft that is equipped with them, and these angles can be different for the two adjacent engines. Similarly, the adjacent engines can have a slightly different position in the longitudinal direction (x), or for another configuration, be slightly offset relative to one another in the general direction of their main shafts. These configurations are not excluded from the invention.

Very obviously, a propulsion assembly according to the invention can comprise more than two adjacent engines.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft propulsion assembly comprising:
a first engine and a second engine that are adjacent and a nacelle in which said first and second engines are installed,
wherein the nacelle comprises a common air inlet lip for the first engine and the second engine, the air flow being divided between the first engine and the second engine by a median lip which extends, at least partly, set back from said common air inlet lip,
wherein the common air inlet lip comprises, directly in line with the median lip, a bottom lobe and a top lobe extending forward of the nacelle,
wherein the first engine comprises a first fan and the second engine comprises a second fan, the first fan and the second fan extending in one and the same plane, and
wherein a circle in which the first fan is inscribed in rotation is separated by at most thirty centimeters, from a circle in which the second fan is inscribed in rotation.

2. The aircraft propulsion assembly as claimed in claim 1, wherein an outer surface of the nacelle forms a single aerodynamic surface common to the first and second engines.

3. The aircraft propulsion assembly as claimed in claim 1, wherein the first engine comprises a first gas ejection nozzle and the second engine comprises a second gas ejection nozzle, and
wherein the first gas ejection nozzle and the second gas ejection nozzle each have an outlet section, defined by an outer wall of the corresponding one of the first and second gas ejection nozzles, of which a portion is straight,
the propulsion assembly being configured such that the straight portion of the outlet section of the first gas ejection nozzle and the straight portion of the outlet section of the second gas ejection nozzle are facing one another on either side of a median plane of symmetry of the propulsion assembly, in contact with one another, or form a wall common to said first and second gas ejection nozzles at said median plane of symmetry of the propulsion assembly.

4. The aircraft propulsion assembly as claimed in claim 3, wherein the outlet section of each of the first and second gas ejection nozzles comprises a semi-circular portion, opposite said median plane of symmetry of the propulsion assembly.

5. The aircraft propulsion assembly as claimed in claim 3, wherein each of the first and second gas ejection nozzles comprises a cone extending longitudinally inside the corresponding gas ejection nozzle and through an outlet section of the corresponding gas ejection nozzle, said cone being shaped such that, at the outlet section of the corresponding gas ejection nozzle, the distance between said cone and the outer wall of the corresponding gas ejection nozzle is constant over all the perimeter of said cone.

6. The aircraft propulsion assembly as claimed in claim 3, wherein the outlet sections of the first and second gas ejections nozzles are oriented so as to be convergent toward the median plane.

7. The aircraft propulsion assembly as claimed in claim 3, further comprising a wall common to the first and second gas ejection nozzles wherein said common wall is stopped upstream of the respective outer walls of said first and second gas ejection nozzles, so as to form an augmented outlet section suitable for increasing the thrust when only one of said first engine and second engine is operating.

8. The aircraft propulsion assembly as claimed in claim 3, wherein an aerodynamic surface is prolonged beyond the outlet section of the first and second gas ejection nozzles, at the median plane (PM), by a local fairing.

9. The aircraft propulsion assembly as claimed in claim 1, wherein the median lip has a curvature in the median plane such that the median lip joins said bottom lobe and top lobe by forming a circular arc.

10. An aircraft propulsion assembly comprising:
a first engine and a second engine that are adjacent and a nacelle in which said first and second engines are installed,
wherein the nacelle comprises a common air inlet lip for the first engine and the second engine, the air flow being divided between the first engine and the second engine by a median lip which extends, at least partly, set back from said common air inlet lip,
wherein the common air inlet lip comprises, directly in line with the median lip, a bottom lobe and a top lobe extending forward of the nacelle, and
wherein the median lip has a curvature in the median plane such that the median lip joins said bottom lobe and top lobe by forming a circular arc.

11. The aircraft propulsion assembly as claimed in claim 10, wherein an outer surface of the nacelle forms a single aerodynamic surface common to the first and second engines.

12. The aircraft propulsion assembly as claimed in claim 10, wherein the first engine comprises a first gas ejection nozzle and the second engine comprises a second gas ejection nozzle, and
wherein the first gas ejection nozzle and the second gas ejection nozzle each have an outlet section, defined by an outer wall of the corresponding one of the first and second gas ejection nozzles, of which a portion is straight,
the propulsion assembly being configured such that the straight portion of the outlet section of the first gas ejection nozzle and the straight portion of the outlet section of the second gas ejection nozzle are facing one another on either side of a median plane of symmetry of the propulsion assembly, in contact with one another, or form a wall common to said first and second gas ejection nozzles at said median plane of symmetry of the propulsion assembly.

13. The aircraft propulsion assembly as claimed in claim 12, wherein the outlet section of each of the first and second gas ejection nozzles comprises a semi-circular portion, opposite said median plane of symmetry of the propulsion assembly.

14. The aircraft propulsion assembly as claimed in claim 12, wherein each of the first and second gas ejection nozzles comprises a cone extending longitudinally inside the corresponding gas ejection nozzle and through an outlet section of the corresponding gas ejection nozzle, said cone being shaped such that, at the outlet section of the corresponding gas ejection nozzle, the distance between said cone and the outer wall of the corresponding gas ejection nozzle is constant over all the perimeter of said cone.

15. The aircraft propulsion assembly as claimed in claim 12, wherein the outlet sections of the first and second gas ejections nozzles are oriented so as to be convergent toward the median plane.

16. The aircraft propulsion assembly as claimed in claim 12, further comprising a wall common to the first and second gas ejection nozzles wherein said common wall is stopped upstream of the respective outer walls of said first and second gas ejection nozzles, so as to form an augmented outlet section suitable for increasing the thrust when only one of said first engine and second engine is operating.

17. The aircraft propulsion assembly as claimed in claim 12, wherein an aerodynamic surface is prolonged beyond the outlet section of the first and second gas ejection nozzles, at the median plane (PM), by a local fairing.

18. The aircraft propulsion assembly as claimed in claim 10, wherein the first engine comprises a first fan and the second engine comprises a second fan, the first fan and the second fan extending in one and the same plane, and
wherein a circle in which the first fan is inscribed in rotation is separated by at most thirty centimeters, from a circle in which the second fan is inscribed in rotation.

* * * * *